US012761052B2

(12) United States Patent
Okamoto et al.

(10) Patent No.: US 12,761,052 B2
(45) Date of Patent: Oct. 13, 2026

(54) SENSING SYSTEM, SENSING METHOD, AND ANALYZER

(71) Applicant: NTT, Inc., Tokyo (JP)

(72) Inventors: Tatsuya Okamoto, Musashino (JP); Daisuke Iida, Musashino (JP); Yusuke Koshikiya, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 155 days.

(21) Appl. No.: 18/682,212

(22) PCT Filed: Aug. 16, 2021

(86) PCT No.: PCT/JP2021/029927
§ 371 (c)(1),
(2) Date: Feb. 8, 2024

(87) PCT Pub. No.: WO2023/021557
PCT Pub. Date: Feb. 23, 2023

(65) Prior Publication Data

US 2024/0271971 A1 Aug. 15, 2024

(51) Int. Cl.
*G01D 5/353* (2006.01)

(52) U.S. Cl.
CPC ................................ *G01D 5/35361* (2013.01)

(58) Field of Classification Search
CPC .............. G01D 5/35361; G01D 5/353; G01M 11/3172; G01B 9/02084; G01B 9/02044
See application file for complete search history.

(56) References Cited

U.S. PATENT DOCUMENTS

2021/0231526 A1* 7/2021 Seeley .................. G01B 11/18
2021/0348971 A1* 11/2021 Sweeney ................ G01K 11/32

FOREIGN PATENT DOCUMENTS

JP 2011-232138 11/2011
WO WO-2019235232 A1 * 12/2019 ............. G01H 9/004

OTHER PUBLICATIONS

Translation of WO 2019235232 A (Year: 2019).*
Froggatt et al., "High-spatial-resolution distributed strain measurement in optical fiber with Rayleigh scatter," Applied Optics, Apr. 1998, 37(10):1735-1740.
Koyamada et al., "Fiber-Optic Distributed Strain and Temperature Sensing with Very High Measurand Resolution Over Long Range Using Coherent OTDR," Journal of Lightwave Technology, May 2009, 27(9):1142-1146.

* cited by examiner

*Primary Examiner* — Kara E. Geisel
(74) *Attorney, Agent, or Firm* — Fish & Richardson P.C.

(57) ABSTRACT

An object of the present invention is to provide a sensing system, a sensing method, and an analyzing device using OFDR in which a sensing range of strain/temperature is less likely to be limited by a frequency sweep width.
In the sensing method using OFDR, the sensing system according to the present invention employs sequential update, per measurement by one frequency sweep of the probe light, for setting the reference spectrum to the spectrum of an immediately preceding measurement, by which a spectral shift between an n-th measurement and an (n−1)th measurement is obtained, and the spectral shifts individually obtained between the measurements are integrated.

3 Claims, 7 Drawing Sheets

Fig. 7

| LIGHT SOURCE TYPE | WAVELENGTH-TUNABLE LIGHT SOURCE | | EXTERNAL MODULATION LIGHT SOURCE | |
|---|---|---|---|---|
| REPETITION FREQUENCY OF PROBE LIGHT | ~10 Hz | | > 100 Hz | |
| FREQUENCY SWEEP WIDTH OF PROBE LIGHT | ~ 2 THz | | ~ 10 GHz | |
| SENSING RANGE OF STRAIN/TEMPERATURE METHOD OF RELATED ART \| PRESENT METHOD | 13mε/1500K | NO LIMIT | 66με/7.5K | NO LIMIT |
| APPLY TO | LOW-SPEED PHENOMENON SENSING WITH LARGE STRAIN/LARGE TEMPERATURE CHANGE | | HIGH-SPEED PHENOMENON SENSING WITH SMALL STRAIN/SMALL TEMPERATURE CHANGE | HIGH-SPEED PHENOMENON SENSING WITH LARGE STRAIN/LARGE TEMPERATURE CHANGE |

SENSING SYSTEM, SENSING METHOD, AND ANALYZER

CROSS-REFERENCE TO RELATED APPLICATIONS

This application is a National Stage application under 35 U.S.C. § 371 of International Application No. PCT/JP2021/029927, having an International Filing Date of Aug. 16, 2021. The disclosure of the prior application is considered part of the disclosure of this application, and is incorporated by reference in its entirety into this application.

TECHNICAL FIELD

The present disclosure relates to a sensing system using an optical frequency domain reflectometry (OFDR), a sensing method, and an analyzing device thereof.

BACKGROUND ART

FIG. 1 is a diagram explaining a sensing principle using OFDR. OFDR adopts frequency swept light as a probe light. Further, a spectrum S(ν) (FIG. 1(B)) can be analyzed by Fourier transforming a waveform r(τ) (FIG. 1(A)) of Rayleigh backscattered light with respect to the probe light of the optical fiber (for example, see NPL 1).

The spectrum S(ν) of the backscattered light fluctuates (spectral shift) with respect to a strain and a temperature of the optical fiber. For this reason, by detecting how much a reference spectrum $S_{ref}$, obtained in the reference measurement, moves at each measurement (spectral shift Δν), the strain of the optical fiber and the amount of change in temperature can be calculated by the following formula (see, for example, NPL 2).

[Math. 1]

$$-\frac{\Delta\nu}{\nu_0} = 0.78\varepsilon + 6.92\times10^{-6}T \qquad (1)$$

Here, Δν is the spectral shift, $\nu_0$ is a center frequency of the probe light, ε is the strain, and T is the temperature.

CITATION LIST

Non Patent Literature

[NPL 1] M. Froggatt and J. Moore, "High-spatial-resolution distributed strain measurement in optical fiber with Rayleigh scatter," Appl. Opt., vol. 37, No. 10, pp. 1735-1740, 1998.

[NPL 2] Y. Koyamada, M. Imahara, K. Kubota, and K. Hogari, "Fiber-optic distributed strain and temperature sensing with very high measurand resolution over long range using coherent OTDR," IEEE J. Lightw. Technol., vol. 27, No. 9, pp. 1142-1146, 2009.

SUMMARY OF INVENTION

Technical Problem

Since the spectral shift Δν of FIG. 1(B) is calculated using cross-correlation, it needs to be smaller than the frequency sweep width ΔF.

[Math. 2]

$$|\Delta\nu| < \Delta F$$

Therefore, the sensing ranges of strain ε and temperature T are given by the following formulas.

[Math. 3]

$$|\varepsilon| < \frac{\Delta F}{0.78\nu_0} \qquad (3)$$

[Math. 4]

$$|T| < \frac{\Delta F}{6.92\times10^{-6}\nu_0} \qquad (4)$$

As explained in FIG. 1(B), in the spectral shift amount detection method of the related art, a cross-correlation between the spectrum obtained in the previous reference measurement and the spectrum obtained in each measurement was calculated. That is, the shift amount has been obtained by using the portion, as a standard, named the reference spectrum $S_{ref}$ included within the frequency sweep width GF of the spectrum obtained in the reference measurement, and by determining how much a portion $S'_{ref}$, with the same waveform as that of the reference spectrum $S_{ref}$, of the spectrum obtained in each measurement shifts.

FIG. 2 is a diagram explaining a problem of a spectral shift amount detection method of the related art.

In the first measurement, a part of the same waveform $S'_{ref}$ as the reference spectrum $S_{ref}$ is within the measurement band (frequency sweep width ΔF). Therefore, the cross-correlation between the reference spectrum and the spectrum obtained in the first measurement can be calculated, and the spectral shift Δν can be detected.

On the other hand, in the second measurement, the same waveform $S'_{ref}$ as the reference spectrum $S_{ref}$ fluctuates completely outside the measurement band (frequency sweep width ΔF). Therefore, the cross-correlation between the reference spectrum and the spectrum obtained in the second measurement cannot be calculated, and the spectral shift Δν cannot be detected.

Thus, when the portion of the same waveform $S'_{ref}$ as the reference spectrum $S_{ref}$ obtained in the reference measurement fluctuates outside the range of the frequency sweep width ΔF, the spectral shift Δν cannot be detected. In other words, in the sensing using the OFDR of the related art, there was a problem that the sensing range of strain/temperature was limited by the frequency sweep width ΔF.

Therefore, in order to solve the above problems, the present invention aims to provide a sensing system, sensing method, and an analyzing device using OFDR in which the sensing range of strain/temperature is less likely to be limited by the frequency sweep width.

Solution to Problem

In order to achieve the above object, the sensing system according to the present invention uses a portion of the spectrum acquired in the immediately preceding measurement, which is included in the frequency sweep width GF, as the reference spectrum, instead of the reference measurement.

Specifically, the sensing system according to the present invention is a sensing system that includes a measuring device and an analyzing device, in which the measuring device inputs a probe light whose frequency is swept once into an optical fiber, and repeatedly performing measurement using Optical Frequency Domain Reflectometry (OFDR) for acquiring a spectrum of a backscattered light, and the analyzing device calculates an individual spectral shift that is an amount of change in the spectrum obtained in the current measurement, using the spectrum obtained in the immediately preceding measurement as a reference spectrum, and integrates the individual spectral shift for each measurement up to the current measurement to give the spectral shift at the time of the current measurement.

Moreover, the sensing method according to the present invention includes:

inputting a probe light whose frequency is swept once into an optical fiber, and repeatedly performing measurement using OFDR for acquiring spectrum of a backscattered light;

calculating an individual spectral shift that is an amount of change in the spectrum obtained in the current measurement, using the spectrum obtained in the immediately preceding measurement as a reference spectrum; and integrating the individual spectral shift for each measurement up to the current measurement to give the spectral shift at the time of the current measurement.

Furthermore, the analyzing device according to the present invention is an analyzing device for analyzing spectrum obtained in measurement which a measuring device inputs a probe light whose frequency is swept once into an optical fiber, and repeatedly performs measurement using OFDR for acquiring the spectrum of the backscattered light, calculates an individual spectral shift that is an amount of change in the spectrum obtained in the current measurement, using the spectrum obtained in the immediately preceding measurement as a reference spectrum, and integrates the individual spectral shift for each measurement up to the current measurement to give the spectral shift at the time of the current measurement.

The present invention employs, in the sensing method using OFDR, sequential update, per measurement by one frequency sweep of the probe light, for setting the reference spectrum of an immediately preceding measurement, by which a spectral shift between an n-th measurement and an (n−1)th measurement is obtained, and the spectral shifts individually obtained between the measurement are integrated.

When the amount of change in spectral shift is smaller than the frequency sweep width of the probe light, the spectral shift can be measured. Accordingly, the sensing range can be expanded, by repeating the spectral measurement at high speed to satisfy this condition and sequentially updating the reference spectrum.

Therefore, the present invention can provide a sensing system, a sensing method, and an analyzing device using OFDR in which the sensing range of strain/temperature is less likely to be limited by the frequency sweep width.

The above inventions can be combined whenever possible.

Advantageous Effects of Invention

The present invention can provide a sensing system, a sensing method, and an analyzing device using OFDR in which the sensing range of strain/temperature is less likely to be limited by the frequency sweep width.

BRIEF DESCRIPTION OF DRAWINGS

FIG. 7 is a diagram explaining the effect of the sensing system according to the present invention.

DESCRIPTION OF EMBODIMENTS

Figure 1:
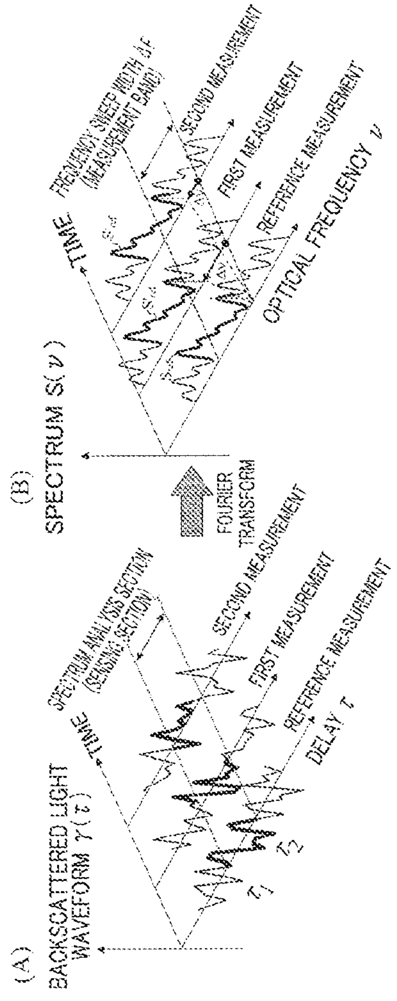
FIG. 1 is a diagram explaining a sensing principle using an OFDR.
Figure 2:
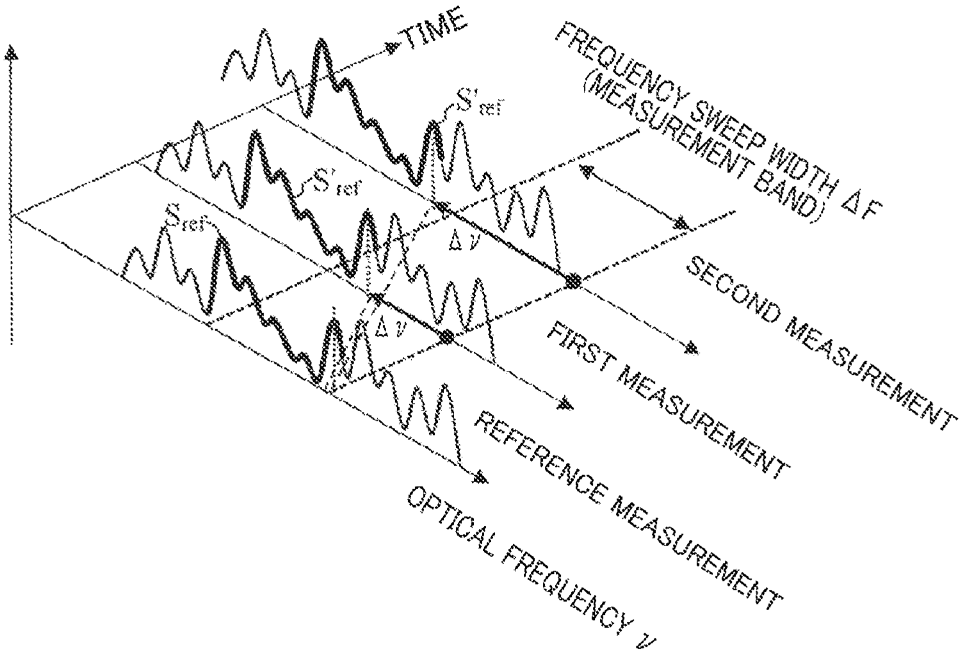
FIG. 2 is a diagram explaining the object of the present invention.

Embodiments of the present invention will be described with reference to the accompanying drawings. The embodiments described below are examples of the present invention, and the present invention is not limited to the following embodiments. Note that, in the present specification and the drawings, components having the same reference numerals indicate the same components.

Figure 3:
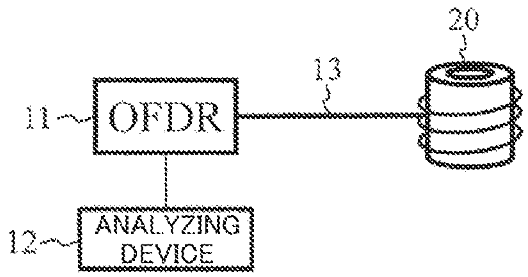
FIG. 3 is a diagram explaining a sensing system according to the present invention.

FIG. 3 is a diagram explaining a sensing system according to the present embodiment. The sensing system is a sensing system that includes a measuring device 11 and an analyzing device 12.

The measuring device 11 inputs a probe light whose frequency is swept once into an optical fiber 13, and repeatedly performs measurement using OFDR for acquiring the spectrum of the backscattered light.

The analyzing device 12 calculates an individual spectral shift that is an amount of change in the spectrum obtained in the current measurement using the spectrum obtained in the immediately preceding measurement as a reference spectrum, and integrates the individual spectral shift for each measurement up to the current measurement to give the spectral shift at the time of the current measurement.

Figure 4:
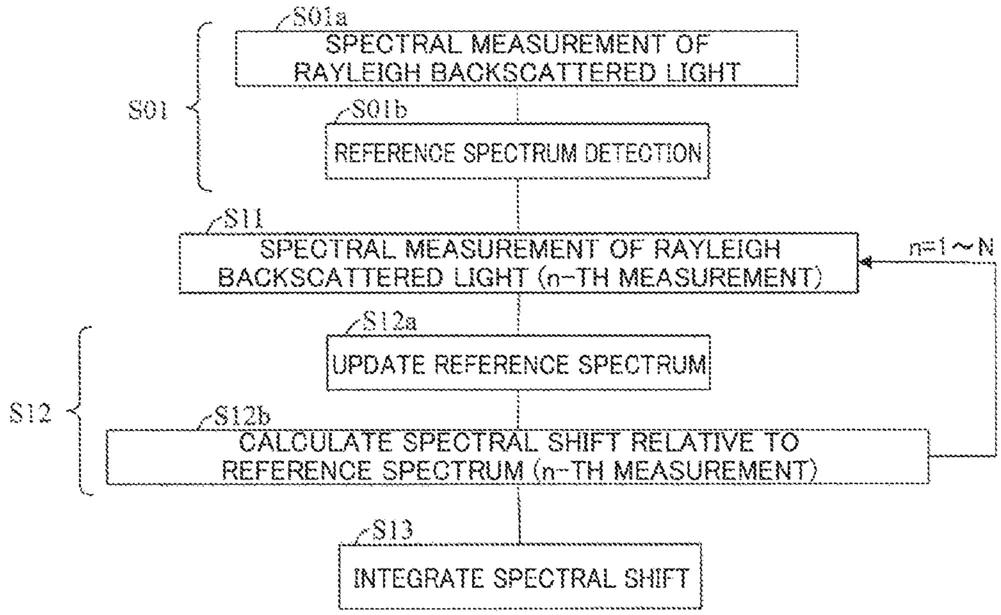
FIG. 4 is a diagram explaining a sensing method according to the present invention.

FIG. 4 is a flowchart explaining a sensing method performed by the sensing system. The sensing method includes inputting a probe light whose frequency is swept once into an optical fiber 13, and repeatedly performing measurement using OFDR for acquiring spectrum of a backscattered light (step S11);

calculating an individual spectral shift that is an amount of change in the spectrum obtained in the current measurement using the spectrum obtained in the immediately preceding measurement as a reference spectrum (step S12); and integrating the individual spectral shift for each measurement up to the current measurement to give the spectral shift at the time of the current measurement (step S13).

Step S01 is a process corresponding to the reference measurement described in FIG. 1, and is a 0th measurement.

Figure 5:
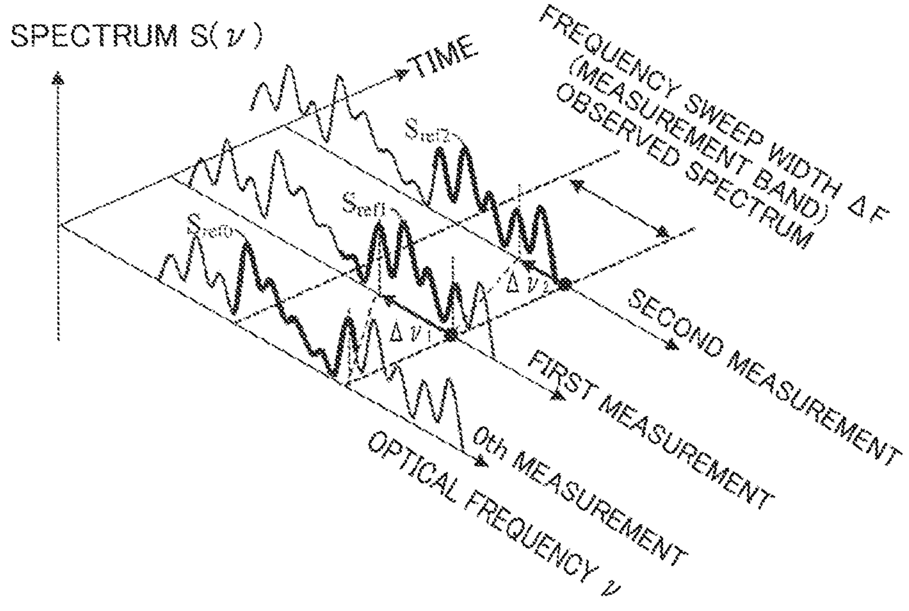
FIG. 5 is a diagram explaining the sensing principle of the sensing system according to the present invention.

FIG. 5 is a diagram explaining an example of a spectrum acquired by the sensing method. The sensing principle of the sensing system will be explained using FIG. 5.

First, the measuring device 11 measures the spectrum S(ν) from the Rayleigh backscattered light for the probe light of the optical fiber 13, using OFDR as the 0th measurement, as described in FIG. 1 (step S01*a*). The analyzing device 12 detects a waveform included in the frequency sweep width ΔF from spectrum S(ν) as reference spectrum $S_{ref0}$ (step S01*b*).

Next, the measuring device 11 measures the spectrum S(ν) from the Rayleigh backscattered light of the probe light of the optical fiber 13, similarly using OFDR as the first measurement (step S11). The analyzing device 12 detects a waveform included within the frequency sweep width ΔF of spectrum S(ν), as reference spectrum $S_{ref1}$ which is a newly updated reference spectrum (step S12*a*). In addition, the analyzing device 12 calculates how much the reference spectrum $S_{ref0}$ has moved in the spectrum S(ν) of the first measurement (spectral shift $\Delta\nu_1$), using the mutual function (step S12*b*).

The sensing system repeats steps S11 and S12 N times (N is an integer equal to or more than 2). That is, the measuring device 11 repeats the above measurement procedure N times, and the analyzing device 12 sequentially updates the reference spectrum $S_{refn}$ per measurement and thereby calculates the spectral shift $\Delta\nu_1$, between the n-th measurement and the n−1-th measurement (n is an integer of 1 or more and N or less).

Here, as explained with reference to FIG. 1(B), the spectral shift $\Delta\nu_r$, needs to be smaller than the frequency sweep width ΔF because it is calculated using cross-correlation.

[Math. 5]

$$|\Delta v_n| < \Delta F$$

If the spectrum shift $\Delta\nu_n$, between the n-th time and the n−1-th time is within the measurement band, the shift amount can be calculated by cross-correlation. In other words, in the face of the shift amount from the spectrum S(ν) of the reference measurement becoming so large that the spectrum shift Δν cannot be calculated as in the conventional measurement, when the shift amount from the reference spectrum $S_{ref(n-1)}$ of the immediately preceding measurement is still within the measurement band, the sensing system can calculate the spectral shift $\Delta\nu_n$.

Then, the analyzing device 12 obtains the spectral shift Δν at time NΔt by finally integrating the spectral shift $\Delta\nu_n$ with respect to n as in the following formula (step S13).

[Math. 6]

$$\Delta v(N\Delta t) = \sum_{n=1}^{N} \Delta v_n \tag{6}$$

Here, Δt is a sampling rate of OFDR, which is a reciprocal of the repetition frequency of the probe light.

In this way, even when the shift amount from the spectrum S(ν) of the reference measurement passes through the measurement band, the sensing system can appear to have an extended measurement bandwidth (sensing range) without substantially compromising a sensing speed, by sequential update for setting the reference spectrum to the spectrum S(ν) of the immediately preceding measurement whose shift amount is within the measurement band.

Other Embodiments

The aforementioned analyzing device can also be achieved by a computer and a program, and the program can be recorded in a recording medium or provided through a network.

EXAMPLES

Figure 6:
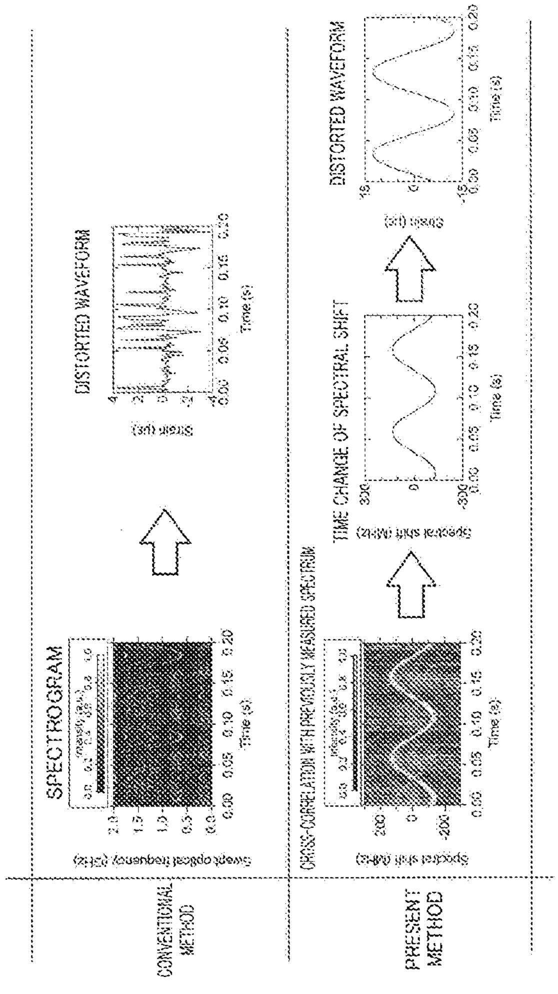
FIG. 6 is a diagram explaining the effect of the sensing system according to the present invention.

FIG. 6 is a diagram explaining the result of comparing the sensing system with the sensing system of the related art.

The system configuration is shown in FIG. 3, and the measurement conditions are as follows.

Optical frequency sweep range of OFDR: 2 GHz

Vibration given to measurement object 20: sine wave (vibration frequency 10 Hz, amplitude 13με)

Conversion factor from spectral shift to distortion: −151 MHz/με

FIG. 6(A) is a spectrum measured by the sensing system of the related art. A horizontal axis is time (seconds), and a vertical axis is a swept optical frequency (GHz). FIG. 6(B) illustrates a distorted waveform obtained by calculating a spectral shift from the spectrum of FIG. 6(A) by cross-correlation (correlation peak search) and converting the spectral shift into distortion. The horizontal axis is time (seconds) and the vertical axis is strain (με).

Because the sensing system of the related art has a sensing range of only 6.5με (=2 GHz÷151 MHz/με÷2) in terms of vibration amplitude, it is not possible to measure vibration with an amplitude of 12με, which exceeds the measurement performance.

FIG. 6(C) shows the spectrum (cross-correlation with the previously measured spectrum) measured by the sensing system. The horizontal axis is time (seconds), and the vertical axis is spectral shift (MHz). FIG. 6(D) is obtained by calculating the time change of the spectral shift in the spectrum of FIG. 6(C) by correlation peak search. The horizontal axis is time (seconds), and the vertical axis is spectral shift (MHz).

FIG. 6(E) is a distorted waveform obtained by integrating the time change of the spectral shift in FIG. 6(D) and converting the spectral shift into distortion. The horizontal axis is time (seconds), and the vertical axis is strain (με).

In the sensing system, the time change of the spectral shift is within the frequency sweep width of 2 GHz, and the vibration with an amplitude of 12με can be measured correctly.

Advantageous Effects of Invention

Since the sensing system of the related art calculates the spectral shift Δν using cross-correlation as explained in Math. 2, unless the spectral shift Δν is smaller than the frequency sweep width ΔF, it cannot be measured.

On the other hand, in the sensing system, since the amount of change in spectral shift d(Δν)/dt is calculated using cross-correlation as shown in the following formula, the amount of change in spectral shift d(Δν)/dt, subject to being smaller than the frequency sweep width ΔF, can be measured.

In other words, since the sensing system is capable of measuring the amount of change in spectral shift when the amount is smaller than the frequency sweep width of the probe light, the sensing range can be expanded by repeating the spectral measurement procedure at high speed to satisfy this condition and updating the reference spectrum.

FIG. 7 is a table in which the performance of the sensing system of the related art and the sensing system are compared. The sensing performance of OFDR is determined by the type of probe light source. When using a wavelength tunable light source, the repetition frequency of the probe light is 10 Hz at maximum, and the frequency sweep width of the probe light is 2 THz at maximum. In this case, regarding the sensing systems of the related art, a maximum strain of 13 mε and a maximum temperature change of 1500K are measurement limits, and only low-speed sensing can be achieved under extreme conditions such as large strain and large temperature change. In addition, in the case of using an externally modulated light source with a repetition frequency of probe light of 100 Hz or higher and a frequency sweep width of the probe light of 2 THz at maximum, the sensing system of the related art has a performance by which high-speed sensing is possible, while distortion of 66με at maximum and temperature change of 7.5K at maximum are measurement limits (small strain and small temperature change).

On the other hand, when the wavelength tunable light source described above is used in the sensing system, the measurement limits of strain and temperature change are eliminated, and low-speed sensing becomes possible under extreme environments such as large strain and large temperature change. Also, even when the above-mentioned externally modulated light source is used in the sensing system, the measurement limits of strain and temperature change are eliminated, and high-speed sensing is operable under extreme environments such as large strain and large temperature change.

REFERENCE SIGNS LIST

11 Measuring device
12 Analyzing device
13 Optical fiber
20 Measuring object

The invention claimed is:

1. A sensing system that includes a measuring device and an analyzing device, wherein the measuring device is configured to input a probe light whose frequency is swept once over a frequency sweep width ΔF into an optical fiber, and repeatedly perform measurement using Optical Frequency Domain Reflectometry (OFDR) for acquiring a spectrum of a backscattered light, and the analyzing device is configured to:

calculate an individual spectral shift that is an amount of change in the spectrum obtained in a current measurement, using a portion of the spectrum obtained in an immediately preceding measurement that falls within the frequency sweep width ΔF as a reference spectrum, and integrate the individual spectral shift for each measurement up to the current measurement to give the spectral shift at a time of the current measurement.

2. A sensing method comprising:

inputting a probe light whose frequency is swept once over a frequency sweep width ΔF into an optical fiber, and repeatedly performing measurement using Optical Frequency Domain Reflectometry (OFDR) for acquiring spectrum of a backscattered light;

calculating an individual spectral shift that is an amount of change in the spectrum obtained in a current measurement, using a portion of the spectrum obtained in an immediately preceding measurement that falls within the frequency sweep width ΔF as a reference spectrum; and integrating the individual spectral shift for each measurement up to the current measurement to give the spectral shift at a time of the current measurement.

3. An analyzing device for analyzing spectrum obtained in measurement which a measuring device inputs a probe light whose frequency is swept once over a frequency sweep width ΔF into an optical fiber, and repeatedly performs measurement using Optical Frequency Domain Reflectometry (OFDR) for acquiring the spectrum of a backscattered light, the analyzing device configured to:

calculate an individual spectral shift that is an amount of change in the spectrum obtained in a current measurement, using a portion of the spectrum obtained in an immediately preceding measurement that falls within the frequency sweep width ΔF as a reference spectrum, and integrate the individual spectral shift for each measurement up to the current measurement to give the spectral shift at a time of the current measurement.

* * * * *